United States Patent
Shupak et al.

(10) Patent No.: US 7,716,495 B2
(45) Date of Patent: May 11, 2010

(54) PROTECTION AGAINST RUNTIME FUNCTION ATTACKS

(75) Inventors: Richard M. Shupak, Bellevue, WA (US); Philip M. Lucido, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 815 days.

(21) Appl. No.: 10/750,297

(22) Filed: Dec. 31, 2003

(65) Prior Publication Data

US 2005/0144471 A1   Jun. 30, 2005

(51) Int. Cl.
G06F 11/30   (2006.01)
G06F 12/14   (2006.01)

(52) U.S. Cl. .................. 713/193; 713/187; 726/22; 726/23

(58) Field of Classification Search .......... 713/193, 713/187; 726/22, 23
See application file for complete search history.

(56) References Cited

U.S. PATENT DOCUMENTS

| | | | |
|---|---|---|---|
| 5,812,828 A * | 9/1998 | Kaufer et al. ............. | 703/22 |
| 6,578,094 B1 * | 6/2003 | Moudgill .................. | 710/57 |
| 6,658,657 B1 * | 12/2003 | Lueh ....................... | 717/158 |
| 6,941,473 B2 * | 9/2005 | Etoh et al. ................ | 726/5 |
| 2003/0018681 A1 * | 1/2003 | Subramanian et al. ..... | 709/102 |
| 2003/0182572 A1 * | 9/2003 | Cowan et al. ............. | 713/200 |
| 2003/0217277 A1 * | 11/2003 | Narayanan ................ | 713/187 |
| 2004/0243833 A1 * | 12/2004 | Spacey .................... | 713/200 |
| 2004/0268365 A1 * | 12/2004 | Bray et al. ................ | 719/318 |

OTHER PUBLICATIONS

Richarte, Gerardo. "Four different tricks to bypass StackShield and StackGuard protection". Core Security Technologies: Apr. 9, 2002. www.coresecurity.com/files/attachments/Richarte_Stackguard_2002.pdf.*

(Continued)

*Primary Examiner*—Edan Orgad
*Assistant Examiner*—Karl L Schmidt
(74) *Attorney, Agent, or Firm*—Woodcock Washburn LLP (57) ABSTRACT

Security mechanisms detect and intervene in a malicious attack against a runtime function, even in the presence of a coding flaw such as a buffer overrun or overflow. One such exemplary mechanism uses a predetermined security list of the valid targets for a first runtime function (such as longjmp). For every call to a second runtime function (e.g., setjmp) that prepares for a later invocation of the first runtime function, the dispatcher finds and stores a reference to this list. When a subsequent attack targets the runtime functions by creating an attacker-provided setjmp target address (e.g., the attack overwrites the longjmp target address so that the pointer points somewhere else, such as code provided by the attacker or code that already exists that will eventually pass control to code provided by the attacker), the new (attacker provided) target address is compared to a reference list of the real (valid) target addresses. The list of real target addresses is stored in memory. If the target address that has been provided is found on the reference list, then the runtime function (e.g., longjmp) is allowed to continue to execute by the dispatcher (which may be the actual runtime function). Otherwise, the dispatcher assumes the application is under attack and terminates the process' execution.

18 Claims, 5 Drawing Sheets

OTHER PUBLICATIONS

Chang, Hoi and Atallah, Mikhail. "Protecting Software Code by Guards." Springer-Verlag Berlin Heidelberg: 2002. (pp. 160-175). http://www.springerlink.com/content/f4ulvxry6jmdkwdh/fulltext.pdf.*

Wagle, Perry and Cowan, Crispin. "StackGuard: Simple Stack Smash Protection for GCC." GCC Developers Summit: 2003. http://gcc-uk.internet.bs/summit/2003/Stackguard.pdf.*

Litchfield, David. "Defeating the Stack Based Buffer Overflow Prevention Mechanism of Microsoft Windows 2003 Server." Sep. 8, 2003. http://www.nextgenss.com/papers/defeating-w2k3-stack-protection.pdf.*

Bernaschi, M. et al., "Operating System Enhancements to Prevent the Misuse of System Calls", *Proceedings of the 7th ACM Conference on Computer and Communications Security*, Nov. 2000, 174-183.

Cierniak, M. et al., "Practicing JUDO: Java™ Under Dynamic Optimizations", *ACM Sigplan Notices, Proceedings of the ACM Sigplan '00 Conference on Programming Language Design and Implementation*, May 2000, 35(5), 13-26.

Cowan, C. et al., "Death, Taxes, and Imperfect Software: Surviving the Inevitable", *Proceedings of the 1998 Workshop on New Security Paradigms*, Jan. 1998, 54-70.

Deng, R.H. et al., "Defending Against Redirect Attacks in Mobile IP", *Proceedings of the 9th ACM Conference on Computer and Communications Security*, 2002, 59-67.

Engler, D.R. et al., "Exokernel: An Operating System Architecture for Application-Level Resource Management", *ACM Sigops Operating Systems Review, Proceedings of the Fifteenth ACM Symposium on Operating Systems Principles*, Dec. 1995, 29(5), 251-266.

Kargl, F. et al, "Protecting Web Servers from Distributed Denial of Service Attacks", *Proceedings of the 10th International Conference on World Wide Web*, 2001, 514-524.

Kent, S.T., "Encryption-Based Protection for Interactive User/Computer Communication", *Proceedings of the 5th Data Communications Symposium*, 1977, 5-7-5-13.

Ogasawara, T. et al., "A Study of Exception Handling and Its Dynamic Optimization in Java", *ACM Sigplan Notices, Proceedings of the OOPSLA '01 Conference on Object Oriented Programming Systems Languages and Applications*, Oct. 2001, 36(11), 83-95.

Pietrek, M., "A Crash Course on the Depths of WIN32™ Structured Exception Handling", *Microsoft Systems Journal*, Jan. 1997, 19 pages.

Ramsey, N., "A Single Intermediate Language That Supports Multiple Implementations of Exceptions", *ACM Sigplan Notices, Proceedings of the ACM SIGPLAN '00 Conference on Programming Language Design and Implementation*, May 2000, 35(5), 285-298.

Yemini, S. et al., "A Modular Verifiable Exception-Handling Mechanism", *ACM Transactions on Programming Language and Systems*, Apr. 1985, 7(2), 214-243.

Zandy, V.C. et al., "Process Hijacking", *Proceedings of the 8th IEEE International Symposium on High Performance Distributed Computing*, 1999, 32(Abstract Attch.).

Zuccherato, R., "RFC-2785: Methods for Avoiding the "Small-Subgroup" Attacks on the Diffie-Hellman Key Agreement Method for S/MIME", *Network Working Group-Entrust Technologies*, 2000, http://delivery.acm.org,11 pages.

* cited by examiner

PROTECTION AGAINST RUNTIME FUNCTION ATTACKS

FIELD OF THE INVENTION

This invention relates in general to the field of computer programming. More particularly, this invention relates to the protection of an attack against a computer application or system component, such as a runtime function.

BACKGROUND OF THE INVENTION

Computer programs often contain flaws, and in some instances these flaws can be exploited in such a way that a security or privacy violation is possible. Conventionally, these flaws could only be prevented by careful testing and code review. Unfortunately, these techniques are not perfect and often production code is released with security flaws. It is desirable to detect a flaw and intervene at the time of attack.

A runtime library is a library of routines that are bound to a program during execution. Exemplary C runtime functions are setjmp and longjmp. The setjmp function saves a stack environment, which can subsequently be restored using longjmp. When used together, setjmp and longjmp provide a technique to execute a nonlocal goto. They are typically used to pass execution control to error-handling or recovery code in a previously called routine without using the normal calling or return conventions.

Conventionally, a call to setjmp saves the current stack environment in "env". A subsequent call to longjmp restores the saved stack environment and execution locale previously saved in env. longjmp returns control to the point just after the corresponding setjmp call. Execution then resumes at that point. All variables (except register variables) accessible to the routine receiving control contain the values they had when longjmp was called. These runtime functions store information in a structure of type jmp_buf. The jmp_buf structure contains a code pointer along with other information.

Runtime functions may put information, such as pointers, on a stack. This has provided attackers with an opportunity to maliciously attack the runtime function model by attacking the stack or the information pointed to by the pointers on the stack. In particular, an attacker can overrun (i.e., overflow) a buffer (e.g., a jmp_buf structure) that can provide the opportunity to rewrite a return address. Because the return address was corrupted (e.g., by being overwritten), the operating system passes control of the program to arbitrary code supplied by the attacker. It is thus desirable to intervene in the middle of an attack and stop an attacker from hijacking the computer or otherwise interfering with the normal operation of the computer. Moreover, it is desirable to protect against an attacker modifying a jmp_buf structure via a buffer overflow or other means.

In view of the foregoing, there is a need for systems and methods that overcome the limitations and drawbacks of the prior art.

SUMMARY OF THE INVENTION

The present invention is directed to security mechanisms which detect and intervene in a malicious attack against a runtime function, even in the presence of a coding flaw such as a buffer overrun or overflow. One such exemplary mechanism uses a predetermined security list of the valid target (return) addresses for a runtime function (such as longjmp). For every call to a runtime function (e.g., setjmp) that will store a target address in a caller provided location, a valid (setjmp) return address is stored in a runtime-owned structure. When a subsequent attack targets the runtime functions by creating an attacker-provided target address (e.g., the attack overwrites the longjmp target address (also referred to herein as the setjmp return address) so that the pointer points somewhere else, such as code provided by the attacker or code that already exists that will eventually pass control to code provided by the attacker), the new (attacker provided) target address is compared to a reference list of the real (valid) target addresses. The list of real target addresses is stored in memory, and desirably cannot be modified. If the target address that has been provided is found on the reference list, then the runtime function (e.g., longjmp) is allowed to continue to execute by the dispatcher (which may be the actual runtime function). Otherwise, the dispatcher assumes the application is under attack and terminates the process' execution.

In accordance with another security mechanism, the compiler recognizes calls to setjmp and emits information into the object file identifying the valid setjmp return address from the setjmp call. The linker collects this information and builds a read-only table that resides in the executable. At runtime when longjmp is called, the target address is checked against the read-only table to determine if the target address is valid or not. The recorded locations (in the .setjmp object file contributions and separate executable table) represent valid setjmp return addresses which are also valid longjmp target addresses.

Other mechanisms use a predetermined security cookie to protect or otherwise validate the buffer in which information, such as pointer information, is stored by the runtime functions. An example of such a buffer is the jmp_buf structure. A security cookie (which can be referred to as a "canary") is added to the jmp_buf structure at the start or at least before the structure fields to be protected. The security cookie can be verified before control is transferred (e.g., by the longjmp function) to the longjmp target address (or setjmp return address). This can protect against not only an attack against the target instruction pointer address but the saved register values as well. If an overflow occurs that allows the protected fields to be overwritten, the cookie will be overwritten too. The implementation of longjmp will check the cookie to determine if the structure is valid. The cookie in this case needs to be a secret from the attacker. It does not need to be a function of the values being protected.

A further mechanism is the inclusion of a cookie that is a function of a secret and the values to be protected. This cookie can appear anywhere in the jmp_buf structure because the verification can determine if any portion of the structure has been overwritten without requiring that the cookie itself be overwritten. The implementation of setjmp would calculate the function of the secret and the fields to be protected and store this in the jmp_buf. Longjmp calculates the same value and compares the result to the stored cookie. If they do not match, then the buffer can not trusted. Thus, a security cookie can be derived from the values in the structure and used alone, or in conjunction, with the predetermined security cookie.

A further security mechanism changes setjmp to store a reversible transformation of the return address values computed using some secret. For example, instead of storing the return address directly, the return address value is XORed with a secret and this stored in the jmp_buf. The implementation of longjmp would reverse the transformation which, in this example, would be to XOR with the secret again. This technique prevents an attacker from providing specific values for the longjmp target or any of the other state that is saved by setjmp or restored by longjmp.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

The present invention protects against a runtime function attack in which a return value or other target value is overwritten, thereby allowing an attacker to essentially hijack the system. The system (such as a compiler) knows which target values, return addresses, or other security mechanisms used in conjunction with the target values, are valid because it checks (and in fact may even create) a list of the return addresses and/or security mechanisms. The system can then verify that a runtime function call is real and not hijacked.

Exemplary Computing Environment

Figure 1:
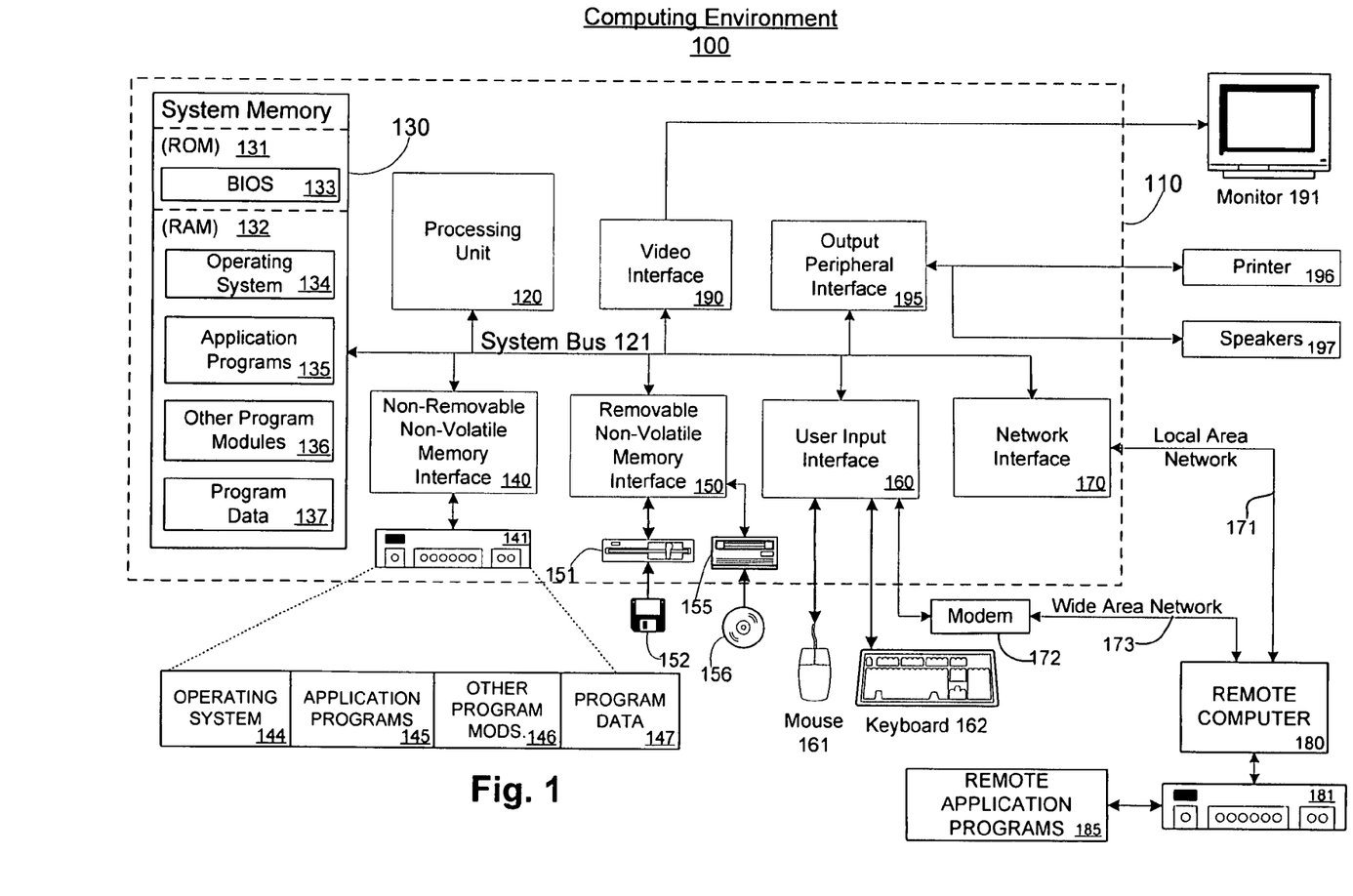
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, DVDs, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented. For example, Microsoft®'s .NET platform includes servers, building-block services, such as web-based data storage, and downloadable device software. While exemplary embodiments herein are described in connection with software residing on a computing device, one or more portions of the invention may also be implemented via an operating system, application programming interface (API) or a "middle man" object between a coprocessor and requesting object, such that services may be performed by, supported in, or accessed via all of Microsoft®'s .NET's languages and services, and in other distributed computing frameworks as well.

Exemplary Embodiments

The present invention provides the capability to prevent a malicious attack against an application or system component, for example, in the presence of a coding flaw such as a buffer overrun. For example, when an attack targets runtime functions such as longjmp by corrupting the values in data structures such as jmp_buf, it will try to provide an attacker-provided setjmp return address that the compiler uses in conjunction with the longjmp return function that, if successful, would provide the attacker with control of the system. The present invention prevents an attacker from getting code of his choosing to execute or otherwise change program state in ways of his choosing.

Figure 2:
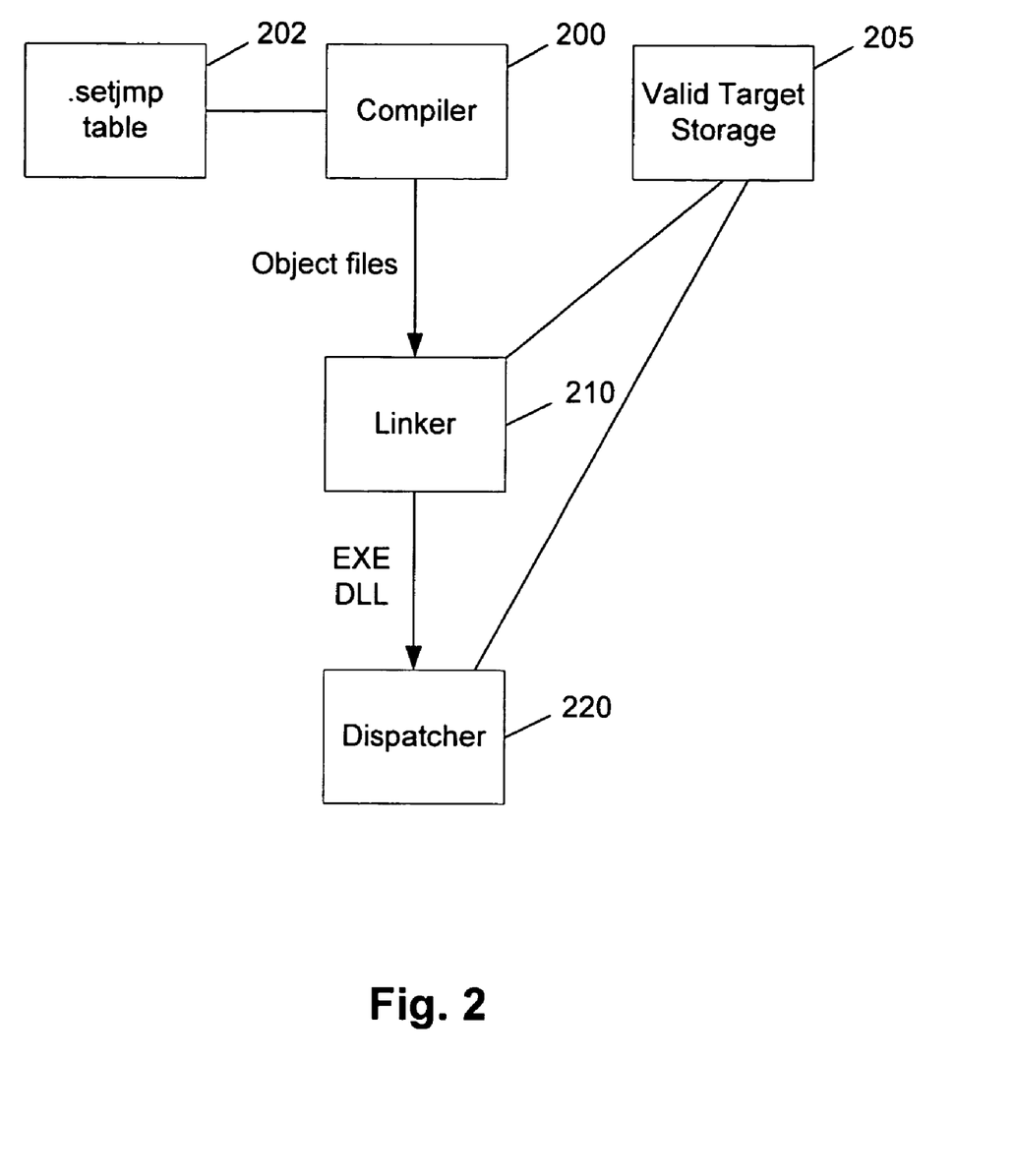
FIG. 2 is a block diagram of an exemplary system that is useful in describing aspects of the present invention.

According to an embodiment of the present invention, the instruction pointer to which longjmp will pass control is protected by the use of a table of valid targets (identified, for example, by their addresses, referred to herein as return addresses). FIG. 2 shows a high level block diagram of an exemplary system that is useful in describing aspects of the present invention. A compiler 200 compiles code and creates object files. A linker 210 brings the object files together into a module, such as an executable or DLL. A storage device or memory 205 is generated by (or otherwise provided by) the linker 210, and stores a list of valid targets or return addresses. A dispatcher 220 determines whether the return address (or other target, such as a security cookie, described below) is valid or not, using data stored in the storage device or memory 205. Further detail is provided below.

In this example, the compiler 200 is desirably provided with the ability to recognize all the calls to setjmp and variants. For every call to setjmp, the compiler 200 emits an entry to a special section such as a table or other storage area or device 202 (e.g., a .setjmp table, as described further below). The compiler 200 records the (setjmp) return address in the .setjmp table 202. When longjmp is to be executed, the system (e.g., the dispatcher 220, which in this example is the implementation of longjmp) looks at the setjmp return address or other target identifier in the jmp_buf structure (e.g., in the .setjmp table 202) and compares it to the table of valid targets or return addresses, and lets processing continue at that address if the address is valid; otherwise, processing will be prohibited from continuing at that return address. It is noted that the .setjmp contributions from table 202 are provided to the linker 210 in the same object file that is provided from the compiler 200 to the linker 210. Thus, the target is verified as a valid target for passing control. If the target is not valid, a failure can be signaled.

Figure 3:
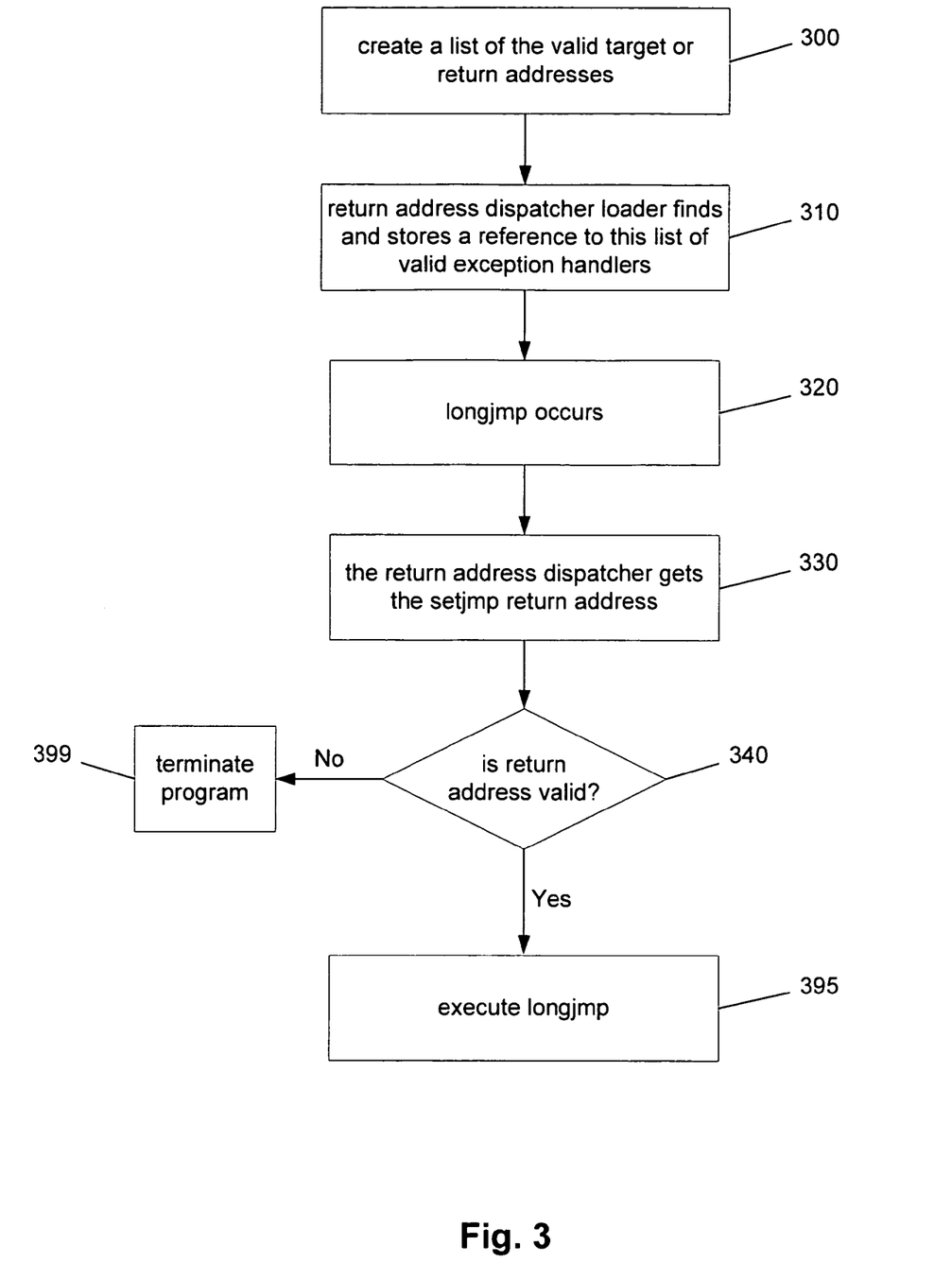
FIG. 3 shows a flowchart of an exemplary runtime protection method in accordance with the present invention.

FIG. 3 shows a flowchart of an exemplary runtime protection method in accordance with the present invention. At step 300, a compiler or other system component creates a list of the valid target or return addresses in an image (a DLL or EXE, for example). The list is inclusive of the valid target or return addresses in the image. Desirably, the list of real targets or return addresses is then stored in read-only memory (e.g., storage 205), so it cannot be modified. Thus, according to aspects of the invention, a global list is built that comprises all the valid target or return addresses for all the images.

A compiler such as compiler 200 compiles code and creates object files for each source file and produces a list of all the target or return addresses referenced in the code, which may or may not be generated by the compiler.

In accordance with an embodiment of the present invention, the compiler emits an identifier (e.g., a particular bit, described below) into the object file. In other words, a compiler (in conjunction with the accompanying toolset, for example) desirably produces an executable that is marked such that the dispatcher knows the executable supports runtime protection. To do this, the compiler produces individual object files that are each marked with a particular bit. Thus, setting this bit declares that a section in the object file comprises a list of valid target or return addresses for the executable code in that object.

According to an embodiment, the list of valid addresses that have been produced by the compiler when creating the object file is stored in a section named ".setjmp" (e.g., a .setjmp table), for example. It is contemplated that if the object file does not contain a .setjmp section, but the bit marking the object file is present, then the code in the object file has no longjmp target or setjmp return addresses. Thus, according to aspects of the invention, a module built by a compiler will have a .setjmp table comprising a list of the known target or return addresses for the module. Therefore, the compiler knows at compile time which functions are truly target or return addresses. This information is preferably stored in a memory (table 202) and shared with the operating system (e.g., dispatcher 220) which can then verify if a called target or return address is valid or not.

A linker 210 then brings the object files together into a module, such as an executable or a DLL. Subsequently, at step 310, when loading the image into a process, a loader (e.g., the dispatcher 220) finds and stores a reference to this list 205 of valid targets or return addresses. Alternatively, the reference to the list 205 can be performed after loading the image into a process (i.e., the table in the executable will not be located until it is needed).

An exemplary sequence of events when a longjmp occurs is as follows. At step 320, a longjmp occurs, and at step 330, a dispatcher 220 finds the proper setjmp return address in a jmp_buf structure that was passed to it as a parameter. The return address dispatcher then determines from the .setjmp table, at step 340, whether the return address is valid or not. If not, the return address dispatcher assumes the application is under attack and terminates the process' execution, at step 399. In such a case, an error message can be generated and displayed, for example.

If the return address is found in the list, it is thus concluded that the return address is valid. If so, the longjmp is allowed to execute, at step 395.

More particularly, according to an embodiment, when a longjmp occurs, the dispatcher, before passing control of execution to the specified return address, determines if the address is in the .setjmp table. If so, the longjmp is permitted to proceed normally. If the return address is not in the .setjmp table, the return address dispatcher (e.g., provided by the operating system) assumes that the return address has been corrupted and aborts the program. Thus, a module (e.g., DLL or EXE) that is compiled with this system will be immune to many runtime target or return address attacks.

Thus, according to an embodiment, a compiler creates a .setjmp section for each object it compiles and includes the addresses of all the valid target or return addresses in this section.

Figure 4:
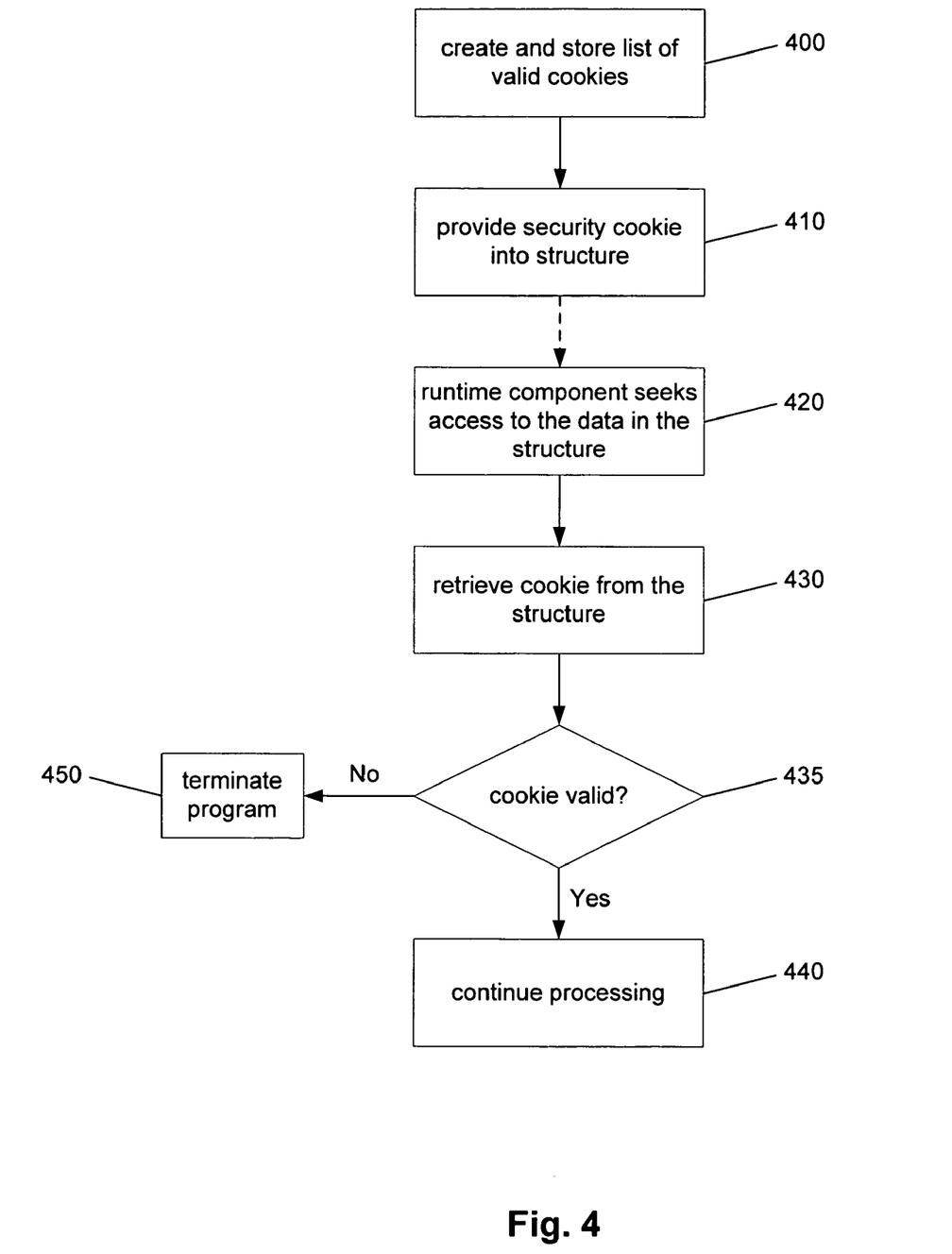
FIG. 4 shows a flowchart of an exemplary runtime protection method that uses a security cookie in accordance with the present invention.

According to another exemplary embodiment, a security cookie is provided that has a non-constant value that can be verified before control is transferred to the target. FIG. 4 shows a flowchart of an exemplary runtime protection method that uses a security cookie. At step 400, a list of valid cookies is created and stored in a memory (e.g., storage 205). A security cookie is then provided at step 410 into a structure that is sought to be protected. The security cookie can be any value or type of data. At some later time, at step 420, a runtime component seeks access to the data in the structure. At step 430, the cookie is retrieved from the structure and compared to the list of valid cookies at step 435. It is contemplated that the list of valid cookies may contain one entry. If the retrieved cookie is determined to be valid as a result of the comparison, then the runtime component is provided access to the other data in the cookie and processing continues, at step 440. If, however, the retrieved cookie is not on the list of valid cookies, it is determined to have been corrupted, in which case the program is aborted, at step 450.

For example, to protect the jmp_buf structure, a security cookie is verified before longjmp transfers control to the target. This can protect against not only an attack against the target instruction pointer address but the saved register values (in the jmp_buf structure) as well. It is contemplated that a jmp_buf structure would have a space (e.g., at the start of the structure) that can be used to hold the cookie. The security cookie acts as a "canary". In longjmp, before transferring control, it is determined if the cookie is still valid. The dispatcher checks the cookie against a list of known valid cookies. If the cookie has changed, then it is determined that the jmp_buf has been corrupted, and the program is aborted. This prevents an attacker from overflowing a local buffer on the stack. The address of the caller is stored on the stack, so if the attacker can overwrite this, he can attack.

Figure 5:
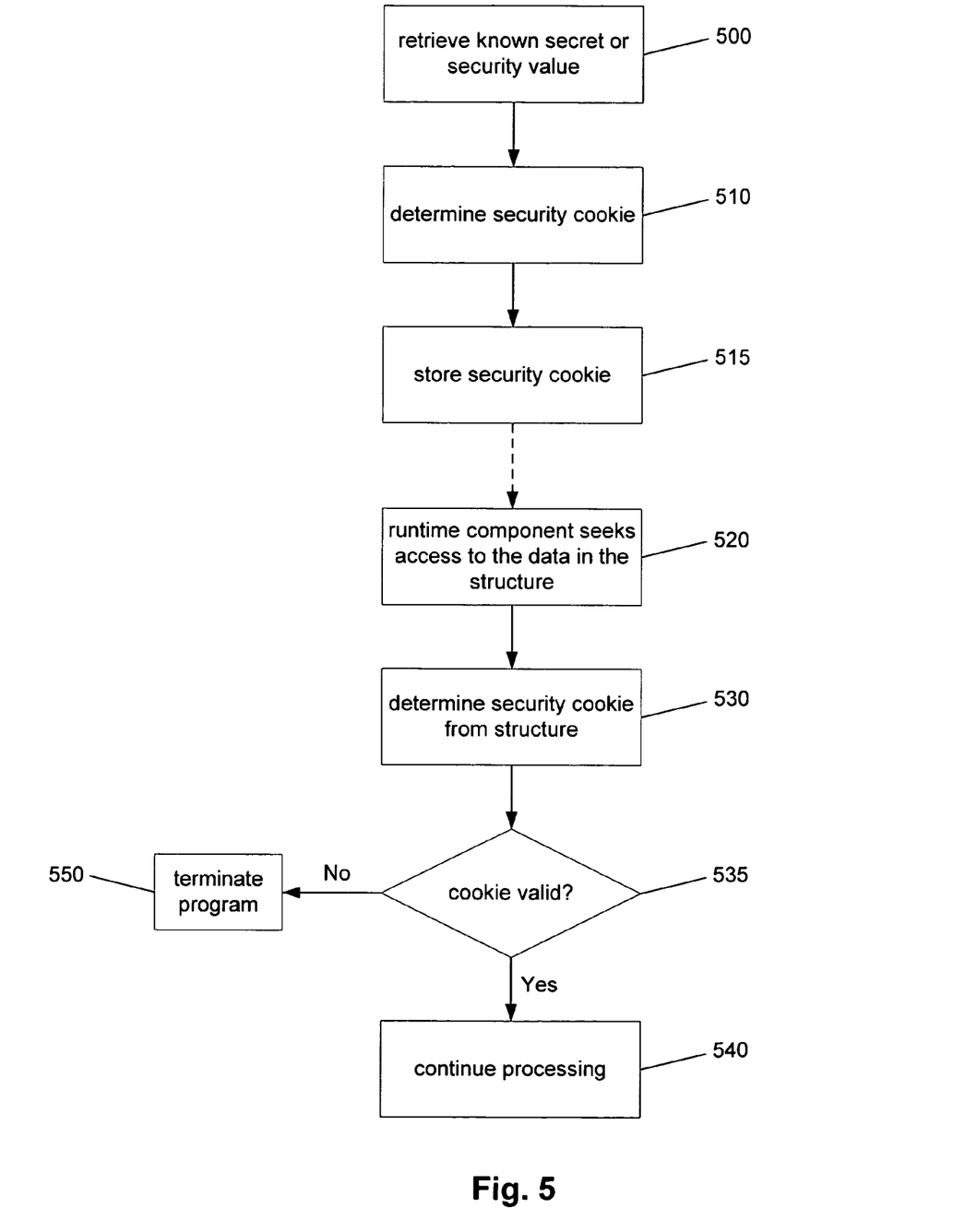
FIG. 5 shows a flowchart of another exemplary runtime protection method that uses a security cookie in accordance with the present invention.

According to another exemplary embodiment, a security cookie is used in conjunction with a secret. The security cookie is preferably derived from values in a runtime structure, as well as a known secret or security value, such as a key or the cookie described above with respect to FIG. 4. FIG. 5 shows a flowchart of an exemplary runtime protection method that uses a security cookie. At step 500, a known secret or security value (or key, for example) is retrieved. A security cookie is then determined, at step 510, based on the known secret as well as additional data from the structure (e.g., as a function of the data in the structure, using conventional encryption techniques, etc.). The security cookie is then stored in a storage device, at step 515, such as in the jmp_buf.

At some later time, at step 520, a runtime component seeks access to the data in the structure. At step 530, the security cookie is determined from the structure (e.g., by using the same function of that used in step 510) and, at step 535, compared to the security cookie that had been stored in step 515. If the newly determined security cookie is determined to be valid as a result of the comparison (i.e., they match), then the runtime component is provided access to the other data in the cookie and processing continues, at step 540. If, however, the retrieved cookie is not on the list of valid cookies, it is determined to have been corrupted, in which case the program is aborted, at step 550. There are other means of validation that do not have to use the same algorithm from step 510. For example, assume the stored cookie is the XOR of the secret and each of the values in the jmp_buf except the cookie itself. One possible validation is to apply the same algorithm and compare the result to the stored cookie. Another possible mechanism is to XOR the stored cookie with all of the remaining values and compare the result to the secret.

For example, the security cookie can be derived from the values in the jmp_buf structure and a known secret value, such as a key or the cookie described above. To generate the security cookie, for example, the values in the jmp_buf structure could all be XORed with one another and with the known value, such as a secret or earlier determined cookie value. The resulting value is stored in the jmp_buf. The cookie value does not need to be at the start of the structure and it protects against overwrites that modify fields within the structure even if they do not overwrite the start. This mechanism protects all the fields in the jmp_buf and not just the instruction pointer.

The jmp_buf structure is validated by determining if any portion of it was changed. Setjmp captures all the values and calculates a security cookie. Before dispatching, longjmp verifies the security cookie is valid, by unencrypting the security cookie, for example.

Thus, in the examples set forth above, when the implementation of longjmp is ready to pass control to the target address in the jmp_buf, it checks to see if the module has a .setjmp section which contains a set of valid return addresses. If a .setjmp section exists, the dispatcher goes to the .setjmp section and determines if the setjmp return address is listed therein, using a binary search, for example. If the setjmp return address is listed, longjmp executes. If the setjmp return address is not listed in the .setjmp section, the call is determined to be malicious and the operating system terminates the program. Alternately or additionally, a security cookie can be checked to provide security.

The present invention substantially eliminates or significantly reduces runtime function attacks. Thus, aspects of the present invention can provide improved security and stability of the operating system that it operates in conjunction with.

It is contemplated that the runtime function protection features of the present invention can be implemented in an operating system, such as a Microsoft® Windows® operating system, and compilers that generate code that run on the OS, such as Visual C++ and the Microsoft® .NET common language runtime's JIT compiler, for example. It is further contemplated that the runtime function protection mechanisms of the present invention can be provided as a stand-alone service or as part of an operating system provided service, for example.

The mechanisms for runtime function protection in accordance with the present invention may be applied to a variety of applications and devices. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the runtime function protection aspects of the present invention can be implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission. When the program code is received and loaded into and executed by a machine, such as an EPROM, a gate array, a programmable logic device (PLD), or a client computer, or the like, it becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer-readable storage medium having stored thereon computer-executable instructions for performing a method of processing runtime functions, the method comprising:

compiling source code files to produce a plurality of object files, each of which is marked with an identifier for indicating that executable code generated from each of the plurality of object files supports runtime protection;

concluding that a first object file has no valid target addresses pertaining to runtime functionality, upon detecting: a) the presence of the identifier in the first object file, and b) the absence of a runtime section of code in the first object file;

concluding that a second object file has a list of valid target addresses pertaining to runtime functionality, upon detecting: a) that the identifier in the second object file is present and has been asserted, and b) that a runtime section of code is present in the second object file;

storing in a table of the second object file, the list of valid target addresses as a reference list of valid target addresses for implementing a runtime function associated with the runtime section of code contained in the second object file;

receiving a call to the runtime function, upon execution of the executable code of the second object file;

determining associated data from the call to the runtime function;

determining a target address from the associated data;

comparing the target address with the reference list of valid target addresses stored in the table;

if the target address is found on the reference list of valid target addresses then executing the runtime function; and if the target address is not found on the reference list of valid target addresses then terminating execution of the runtime function.

2. The method of claim 1, wherein the step of determining the associated data comprises accessing data in a data structure connected with the runtime function and calculating the associated data based on the accessed data.

3. The method of claim 1 comprising the step of generating the reference list of valid target addresses during execution of a previous runtime function.

4. The method of claim 1 wherein the step of storing in the table comprises storing in a caller provided location during execution of a previous runtime function.

5. The method of claim 1, further comprising:
determining if at least a portion of the associated data is valid; and
preventing execution of the runtime function if the associated data is not valid.

6. The method of claim 5, wherein the step of determining if the associated data is valid comprises retrieving a security cookie from the associated data and comparing the retrieved security cookie to a list of valid security cookies.

7. The method of claim 5, further comprising determining and storing a predetermined calculated value based on at least a portion of the associated data, prior to receiving the call to the runtime function.

8. The method of claim 7, wherein determining if the associated data is valid comprises comparing the predetermined calculated value to another calculated value based on the associated data.

9. The method of claim 1, wherein the identifier is an identifier bit that is operable to be set for indicating assertion of the identifier.

10. The method of claim 1, wherein the table is a setjmp table and the call to the runtime function is a longjmp.

11. A computer system that includes a computer-readable storage medium having stored thereon program modules for processing runtime functions, the program modules comprising:

a compiler that compiles source code files to produce a plurality of object files, wherein each of the plurality of object files is produced by the compiler with an identifier that operates as a marker which when placed in a set condition provides an indication that the object file contains a list of valid target addresses for use in implementing runtime protection;

a processor that:
concludes that a first object file has no valid target addresses pertaining to runtime functionality, upon detecting the presence of the identifier in the first object file, and the absence of a runtime section of code in the first object file;
concludes that a second object file has a list of valid target addresses pertaining to runtime functionality, upon detecting that the identifier in the second object file is present and has been asserted, and that a runtime section of code is present in the second object file; and
receives a call to a runtime function upon execution of the executable code of the second object file; and a dispatcher system that determines associated data from the call to the runtime function, determines a target address from the associated data, and if the target address is found on the list of valid target addresses then executes the runtime function.

12. The system of claim 11, wherein the dispatcher system comprises a module to access data in a data structure connected with the runtime function and calculate the associated data based on the accessed data.

13. The system of claim 11, wherein the compiler generates the list of valid target addresses.

14. The system of claim 11, wherein the dispatcher system comprises modules to determine if at least a portion of the associated data is valid and prevent execution of the runtime function if the associated data is not valid.

15. The system of claim 14, further comprising a storage device that stores the list of valid target addresses.

16. The system of claim 14, wherein the dispatcher system determines if the associated data is valid by retrieving a security cookie from the associated data and comparing the retrieved security cookie to a list of valid security cookies.

17. The system of claim 14, wherein the processor determines and stores a predetermined calculated value based on at least a portion of the associated data, prior to receiving the call to the runtime function.

18. The system of claim 17, wherein the dispatcher system determines if the associated data is valid by comparing the predetermined calculated value to another calculated value based on the associated data.

* * * * *